(12) United States Patent
Yan et al.

(10) Patent No.: US 11,800,057 B2
(45) Date of Patent: Oct. 24, 2023

(54) SYSTEM AND METHOD OF SPEAKER REIDENTIFICATION IN A MULTIPLE CAMERA SETTING CONFERENCE ROOM

(71) Applicant: Plantronics, Inc., Santa Cruz, CA (US)

(72) Inventors: Yong Yan, Leander, TX (US); Kui Zhang, Austin, TX (US); David Young, Austin, TX (US)

(73) Assignee: Plantronics, Inc., Santa Cruz, CA (US)

( * ) Notice: Subject to any disclaimer, the term of this patent is extended or adjusted under 35 U.S.C. 154(b) by 37 days.

(21) Appl. No.: 17/646,704

(22) Filed: Dec. 31, 2021

(65) Prior Publication Data
US 2023/0216988 A1 Jul. 6, 2023

(51) Int. Cl.
| | |
|---|---|
| *H04N 7/15* | (2006.01) |
| *H04N 13/282* | (2018.01) |
| *G06V 40/16* | (2022.01) |
| *G10L 17/06* | (2013.01) |
| *H04L 12/18* | (2006.01) |
| *H04S 7/00* | (2006.01) |

(52) U.S. Cl.
CPC .............. *H04N 7/15* (2013.01); *G06V 40/161* (2022.01); *G10L 17/06* (2013.01); *H04L 12/1822* (2013.01); *H04N 13/282* (2018.05); *H04S 7/303* (2013.01)

(58) Field of Classification Search
CPC ........ H04N 7/15; H04N 7/147; H04N 13/262; H04L 12/18; H04L 65/1083; H04L 12/1822; H04S 7/00; G06V 40/16; G06F 3/04845

USPC ............................................ 348/14.01–14.16
See application file for complete search history.

(56) References Cited

U.S. PATENT DOCUMENTS

| | | | |
|---|---|---|---|
| 9,986,360 B1 | 5/2018 | Aas et al. | |
| 10,582,117 B1 | 3/2020 | Tanaka et al. | |
| 11,076,127 B1 * | 7/2021 | Schaefer | H04N 7/15 |
| 2011/0096137 A1 * | 4/2011 | Baker | H04N 7/147 |
| | | | 348/E7.083 |
| 2011/0285809 A1 | 11/2011 | Feng et al. | |
| 2012/0218371 A1 | 8/2012 | Cutler | |
| 2017/0034481 A1 * | 2/2017 | Igarashi | H04L 65/1063 |
| 2022/0319032 A1 * | 10/2022 | Fan | G06T 7/70 |

(Continued)

FOREIGN PATENT DOCUMENTS

WO 2021/243631 A1 12/2021

*Primary Examiner* — Melur Ramakrishnaiah
(74) *Attorney, Agent, or Firm* — Quarles & Brady LLP

(57) ABSTRACT

In a multi-camera videoconferencing configuration, the locations of each camera are known. By referencing a known object visible to each camera, a 3D coordinate system is developed, with the position and angle of each camera being associated with that 3D coordinate system. The locations of the conference participants in the 3D coordinate system are determined for each camera. Sound source localization (SSL) from one camera, generally a central camera, is used to determine the speaker. The pose of the speaker is then determined. From the pose and the known locations of the cameras, the camera with the best frontal view of the speaker is determined. The 3D coordinates of the speaker are then used to direct the determined camera to frame the speaker. If the face of the speaker is not sufficiently visible, the next best camera view is determined, and the speaker framed from that camera view.

20 Claims, 13 Drawing Sheets

(56) References Cited

U.S. PATENT DOCUMENTS

2022/0400216 A1* 12/2022 Wang ................... G10L 25/78
2023/0081717 A1* 3/2023 Hoang ............... H04L 65/1083

* cited by examiner

SYSTEM AND METHOD OF SPEAKER REIDENTIFICATION IN A MULTIPLE CAMERA SETTING CONFERENCE ROOM

TECHNICAL FIELD

This disclosure relates generally to camera selection in a videoconference.

BACKGROUND

The most common configuration of a conference room for videoconferencing has a single camera adjacent a monitor or television that sits at one end of the room. One drawback to this configuration is that if a speaker is looking at someone else in the conference room while talking, the speaker does not face the camera. This means that the far end only sees a side view of the speaker, so the speaker does not appear to be speaking to the far end.

Efforts have been made to address this problem by providing multiple cameras in the conference room. The idea is to have the cameras pointed in different directions and then selecting a camera that provides the best view of the speaker, preferably zooming and framing the speaker. The efforts improved the view of the speaker but only in single individual settings, which often were not a problem as the speaker would usually be looking at the monitor and hence the single camera. If multiple individuals were present in the conference room and visible in the various camera views, the efforts did not provide good results.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
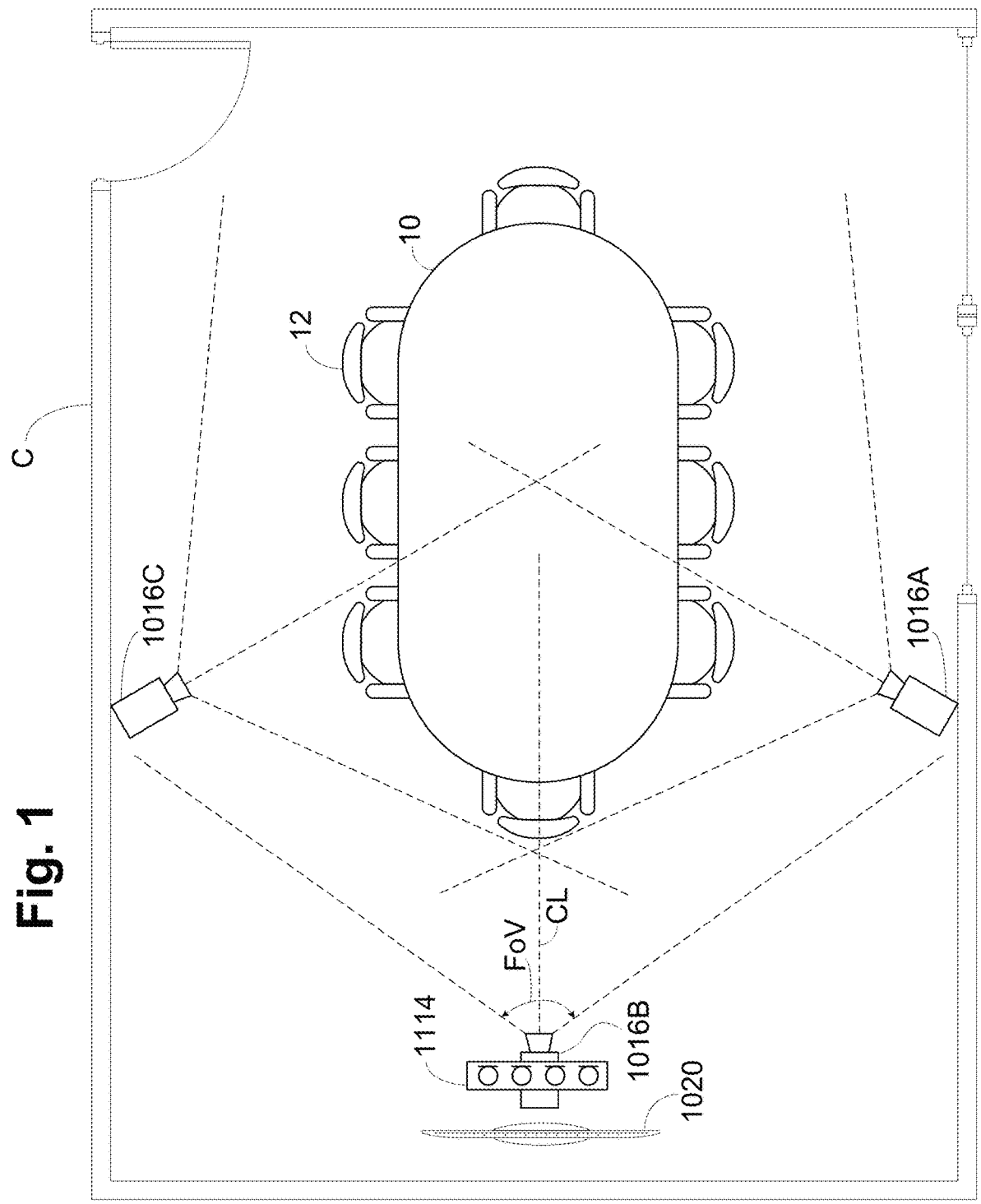
FIG. 1 is an illustration of a conference room containing three cameras, a monitor and desk and chairs.

In a multi-camera videoconferencing configuration, the locations of each camera are known. By referencing a known object visible to each camera, a 3D coordinate system is developed, with the position and angle of each camera being associated with that 3D coordinate system. The locations of the conference participants in the 3D coordinate system are determined for each camera. Sound source localization (SSL) from one camera, generally a central camera, is used to determine the speaker. The pose of the speaker is then determined. From the pose and the known locations of the cameras, the camera with the best frontal view of the speaker is determined. The 3D coordinates of the speaker are then used to direct the determined camera to frame the speaker. If the face of the speaker is not sufficiently visible, the next best camera view is determined, and the speaker framed from that camera view.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

Referring now to FIG. 1, a conference room C configured for use in videoconferencing is illustrated. Conference room C includes a conference table 10 and a series of chairs 12. A series of three cameras 1016A, 1016B and 1016C are provided in the conference room C to view individuals seated in the various chairs 12. A monitor or television 1020 is provided to display the far end conference site or sites and generally to provide the loudspeaker output. Each camera 1016A, 1016B, 1016C has a field-of-view (FoV) and an axis or centerline (CL). In the layout of FIG. 1, the cameras 1016A, 1016B, 1016C are positioned such that camera 1016B has its CL centered on the length of the conference table 10 and cameras 1016A and 1016C are at an angle to the conference table 10, so that camera 1016B is the center camera. This allows the cameras 1016A and 1016C to have a better opportunity to see the faces of individuals seated on the sides of the conference table 10 when the individuals are looking at other individuals in the conference room C, while camera 1016B has a better opportunity to see the faces when the individuals are looking at the monitor 1020. At least the center camera 1016B includes a microphone array 1114 to be used to do sound source localization (SSL).

Figure 2:
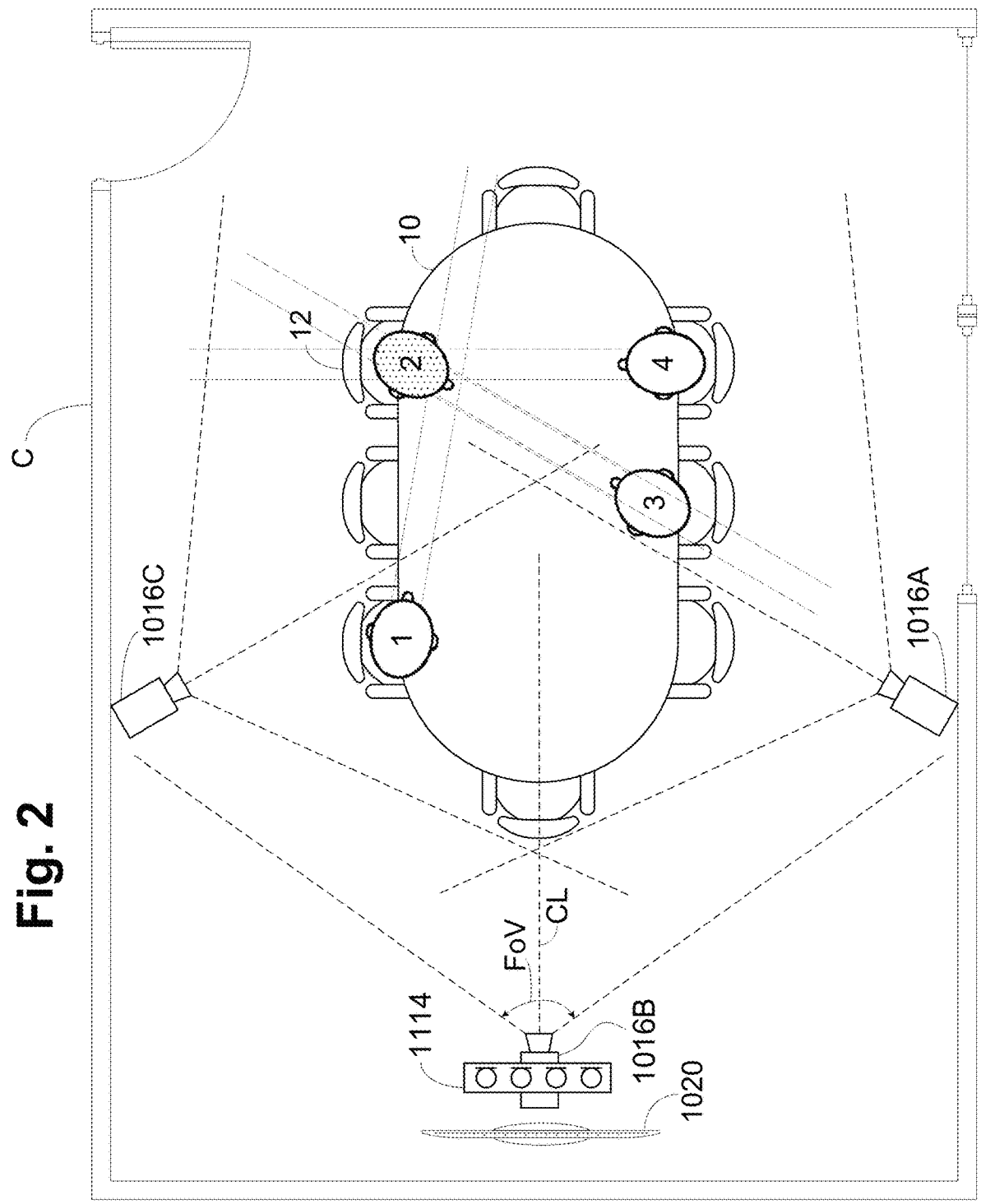
FIGS. 2, 3 are illustrations of the conference room of FIG. 1 with various individuals, with one individual speaking.
Figure 3:
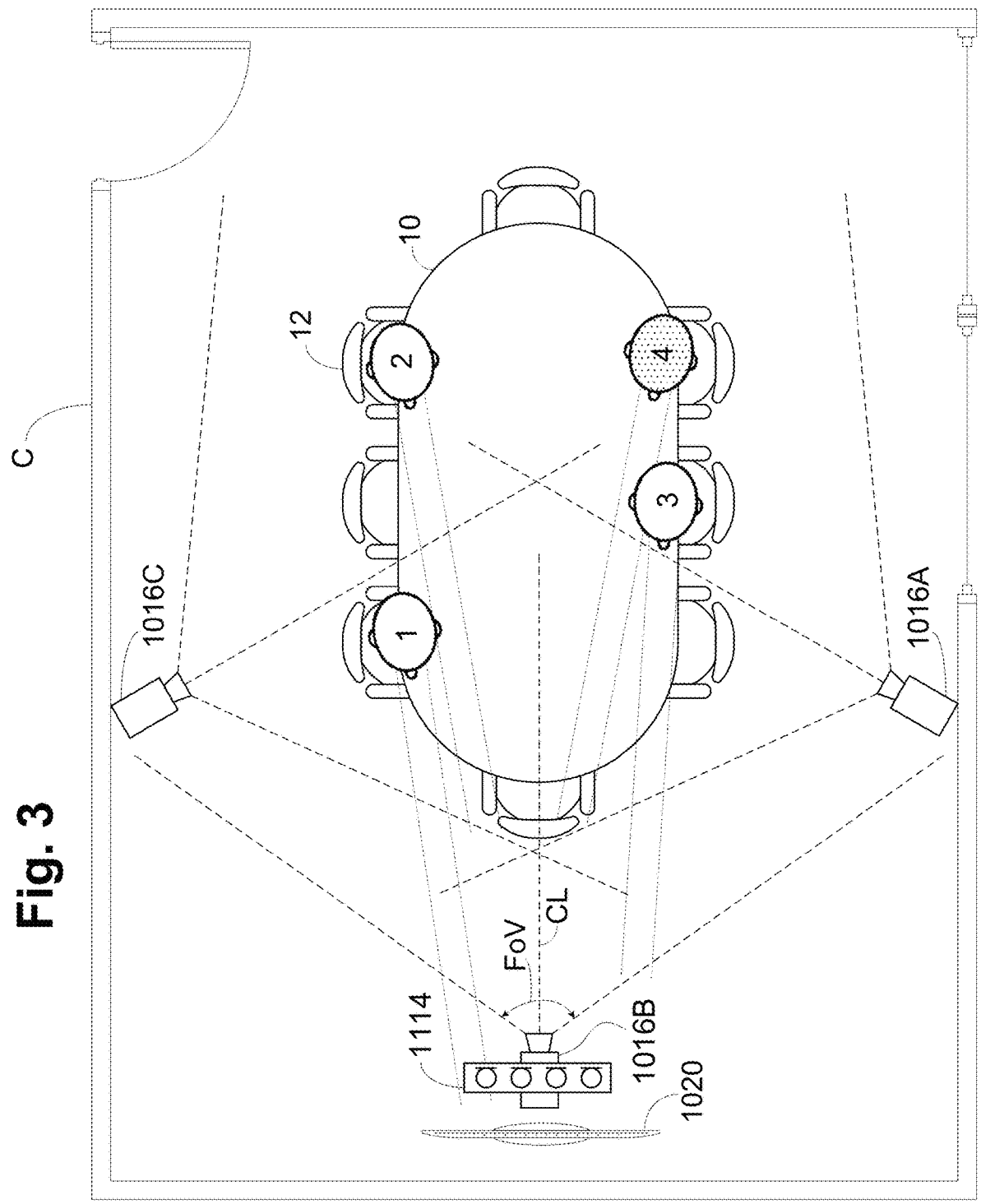

In FIG. 2, individual 2 is the speaker and individuals 1, 3 and 4 are facing individual 2. Camera 1016B will have the best view of individual 2's face, as the view by camera 1016A is blocked by individual 3. In FIG. 3, individual 4 is speaking but all of the individuals 1, 2, 3, 4 are facing the monitor 1020. If individual 4 is in a conversation with a speaker from the far end, all individuals 1, 2, 3, 4 may be facing the monitor 1020, but individual 4 is speaking. Camera 1016C will have the best view of individual 4's face, so a framed version of the individual 4's face is provided to the far end, as opposed to a view of the entire room when no individuals are speaking.

It is noted in FIGS. 2 and 3 that each of the cameras 1016A, 1016B, 1016C can see all four individuals. This means that each of the cameras 1016A, 1016B, 1016C has the possibility of seeing the face of the speaking individual. To determine the particular individual that is speaking, the microphone array 1114 present on the center camera 1016B is utilized with a sound source localization algorithm to determine the particular individual which is speaking. That individual's 3D coordinates are determined and that individual's angle in the field-of-view of the center camera 1016B is determined. Using the angle, camera 1016C is determined to have the best frontal view and the 3D coordinates are used to frame individual 4 in the view of camera 1016C. This allows the correct speaker to be located and framed, with a zoomed version of the individual's face provided if available and satisfactory.

Figure 4:
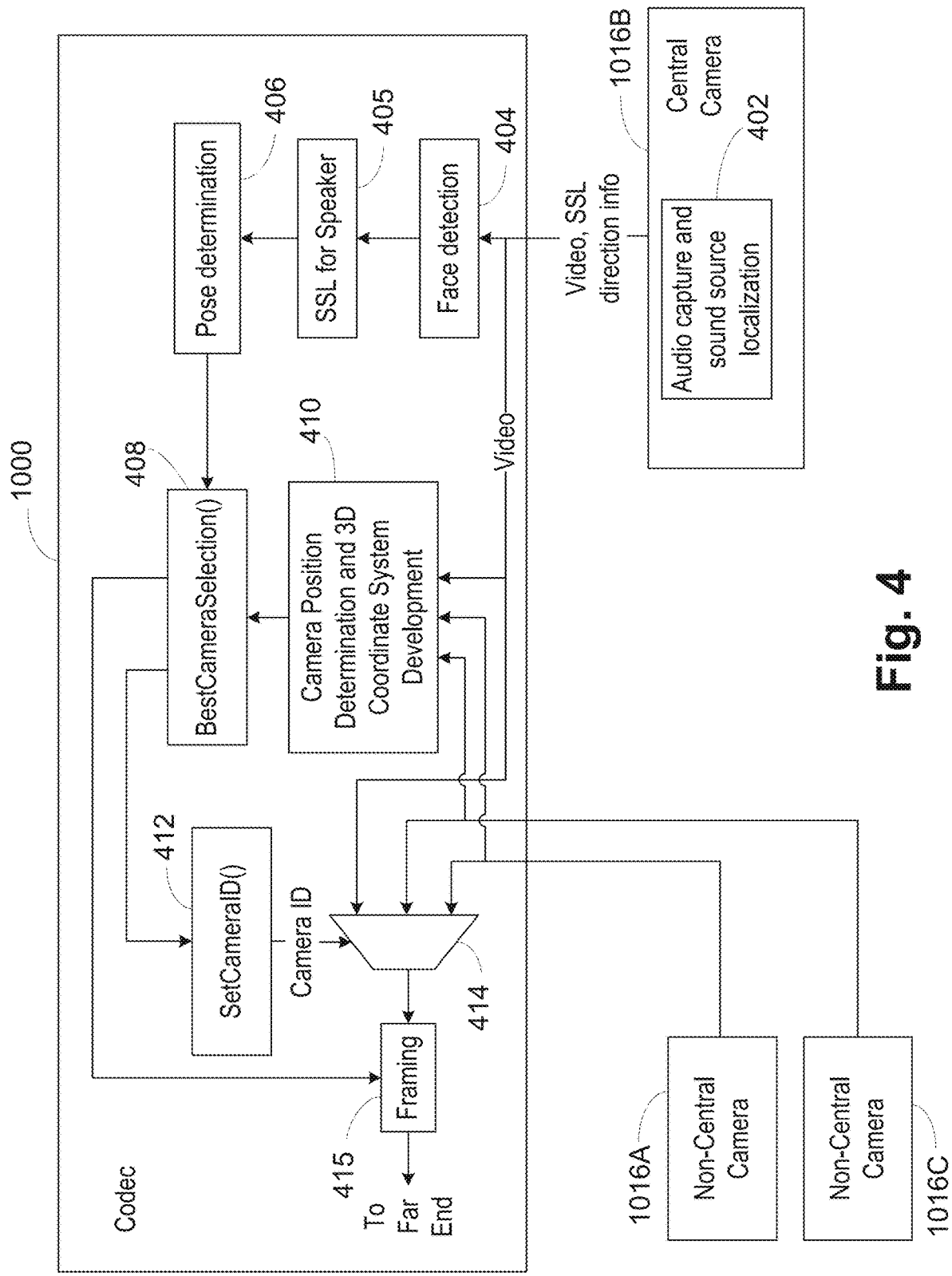
FIG. 4 is an illustration of division of operations between a codec and a camera according to an example of this disclosure.

In the preferred example, the processing of the audio and video and selection of a desired camera is split between the center camera 1016B and a codec 1000. Referring to FIG. 4, the center camera 1016B performs sound source localization (SSL) in step 402 based on sound received at the microphone array 1114 and provides direction information. In step 404, an image from the center camera 1016B video is processed by the codec 1000 to detect faces. This is preferably done using a neural network to provide a series of bounding boxes, one for each face. There are numerous variations of neural networks to perform face detection and provide bounding box outputs. The SSL direction information of step 402 is combined with the bounding boxes provided by step 404 to select the area of the camera image of the speaker in step 405. That area is analyzed by a neural network in step 406 to determine the facial pose of the speaker, the direction in which the speaker is looking. As with face detection, there are numerous variations of neural networks to determine facial pose. The video stream from each of the cameras 1016A, 1016B, 1016C is also provided to a multiplexer or switch 414 in the codec 1000 for selection of the video to be provided to the far end.

It is understood that the SSL determination, face detection and facial pose analysis is only performed periodically, not for every video frame, such as once every one second to once every five seconds in some examples. This is satisfactory as the speaker and the individual's location do not change much faster than those periods and because camera switching should not be performed rapidly to avoid disorienting the far end.

It is understood that steps 404 and 406 are illustrated as separate steps. The face detection and facial pose determination can be combined in a single neural network, so that steps 404 and 406 are then merged. Such single neural network would combine the SSL direction information and video image to determine the speaker from among the individuals and the facial pose of that individual in the processing performed by the single neural network. The actual operation of the single neural network may not operate in the order as illustrated in the serial operations of steps 404 and 406, as the neural network may process all of the input data in parallel, but the functional result of the operation of the single neural network will be the same as the series operation of steps 404 and 406, namely the facial features of the speaker.

In step 410, the codec 1000 uses the video from the cameras 1016A, 1016B, 1016C and the measured camera locations to develop a 3D coordinate system. This operation is detailed in FIG. 6. In step 408, the codec 1000 receives the facial pose of the speaker. The best camera selection step 408, shown in more detail in FIG. 7, determines which of the various cameras 1016A, 1016B, 1016C has the best view of the face of speaking individual. The best camera selection step 408 determines the particular camera 1016A, 1016B, 1016C whose video stream is to be provided to the far end and provides that in step 412 to the multiplexer 414. The video from the selected camera 1016A, 1016B, 1016C and the audio from microphones 1014A, 1014B connected to the codec 1000 are provided to the far end. The best camera selection step 408 provides framing information so that in step 415 the speaker is properly framed in the video provided to the far end.

Figure 5A:
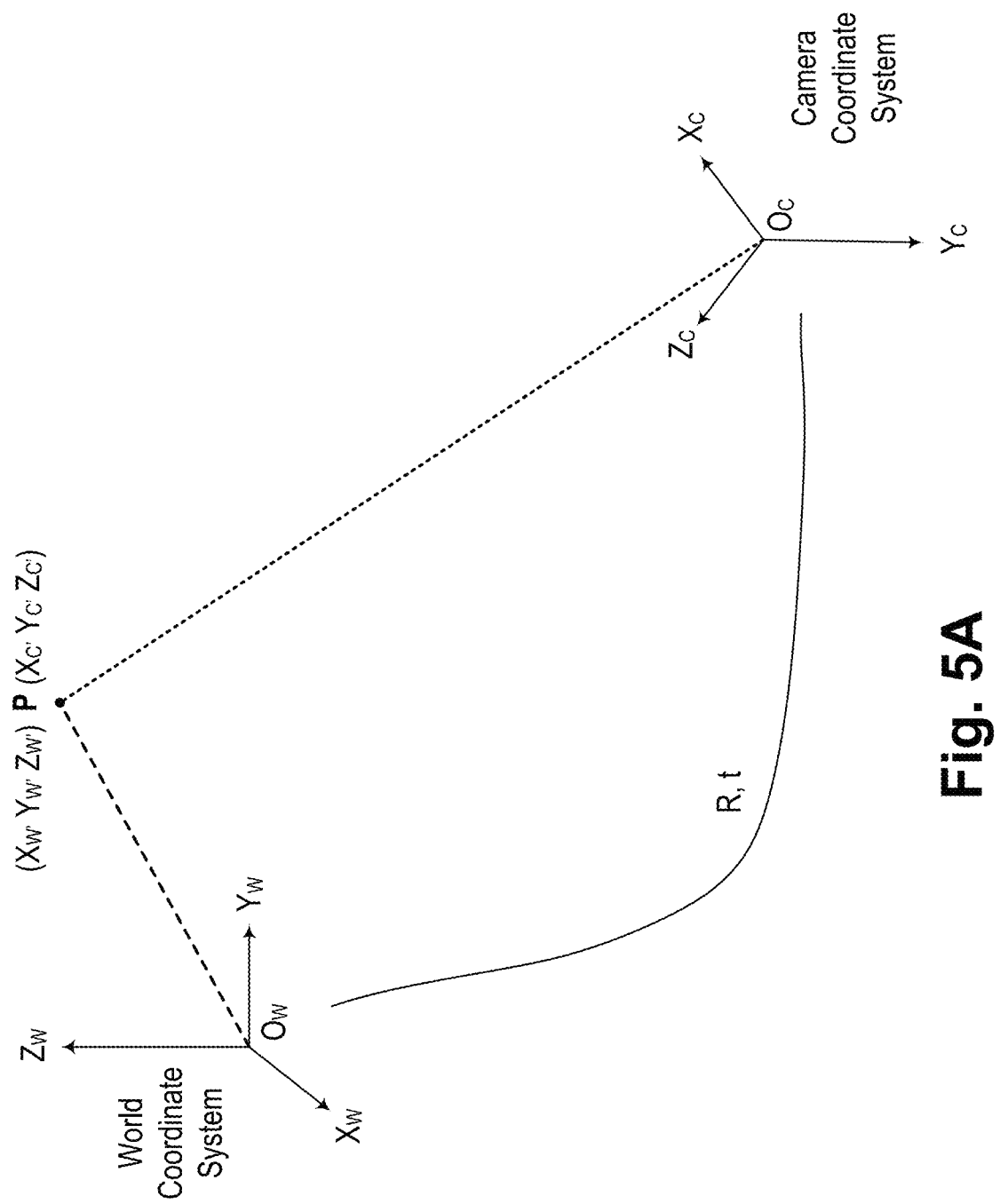
FIG. 5A is an illustration of relevant coordinate systems according to an example of this disclosure.

FIG. 5A illustrates the two 3D coordinate systems used in determining the location of the speaker. A first 3D coordinate system is the world coordinate system, typically the coordinate system based on the conference room where the video conferencing system formed by the codec 1000 and cameras 1016A, 1016B, 1016C are installed. A second 3D coordinate system is the camera coordinate system, it being understood that there is a separate camera coordinate system for each camera 1016A, 1016B, 1016C. The world coordinate system and the camera coordinate system are related by a rotation R and a translation t. The rotation R and translation t are used to convert between the two coordinate systems. A point P in the conference room then has coordinates of $X_W$, $Y_W$, $Z_{W'}$ in the world coordinate system and coordinates of $X_{C'}$, $Y_{C'}$, $Z_{C'}$ in the camera coordinate system.

Figure 5B:
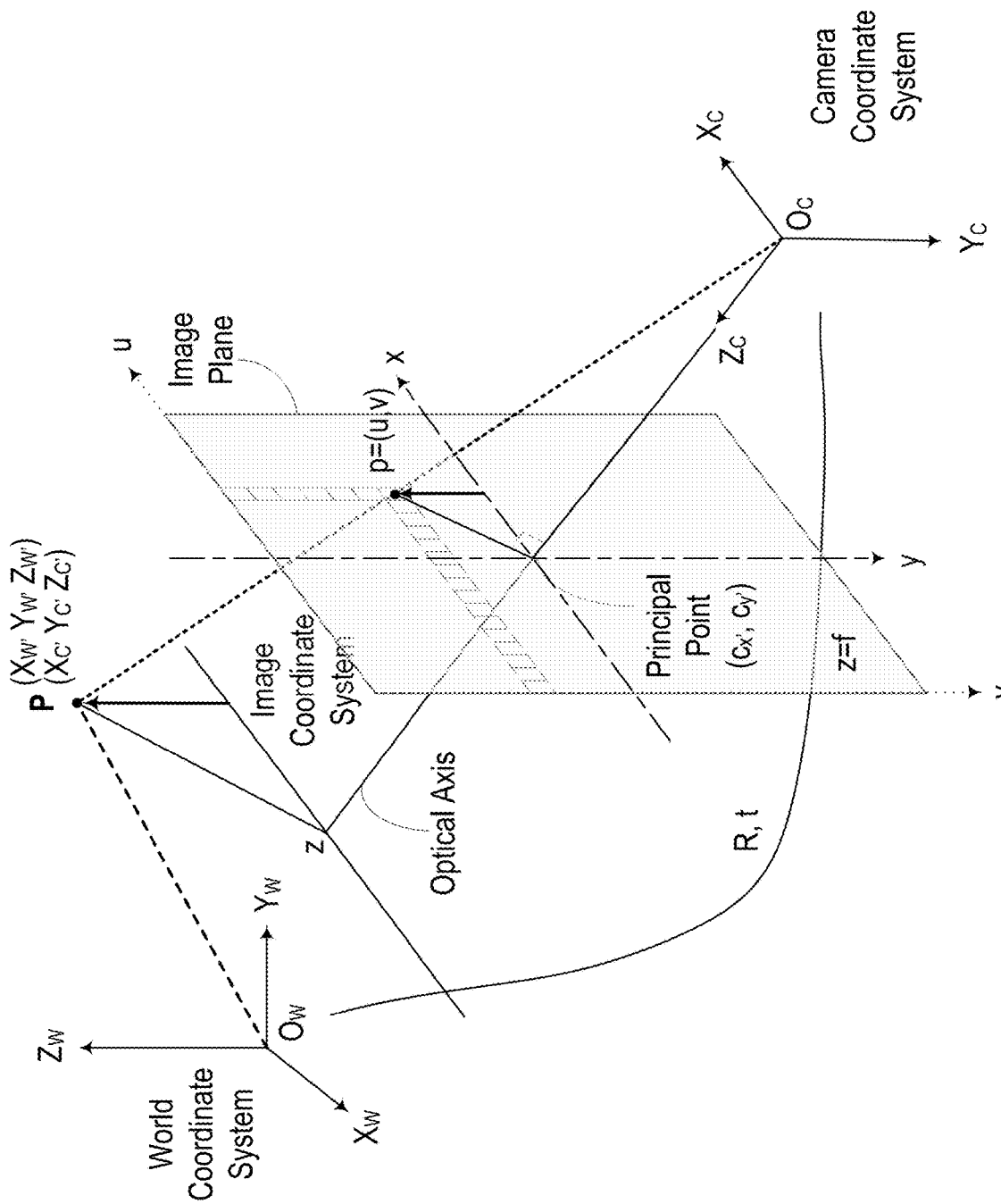
FIG. 5B is an illustration of the projection of a camera into the coordinate systems of FIG. 5A.

FIG. 5B adds the 2D camera image plane to FIG. 5A and the 2D image coordinate system. In the image coordinate system, the point p is at pixels u, v. Knowing the pixel dimensions and the distance from the optical center, the origin of the camera coordinate system, to the image plane, the focal length of the camera, projection then provides the X and Y coordinates to the point P, with the Z coordinate unknown. By using the same point P in each camera 1016A, 1016B, 1016C and performing the relevant camera coordinate system to world coordinate system translations, the rotations for each camera coordinate system can then be determined. This then allows aligning the X and Y coordinates for each camera 1016A, 1016B, 1016C, which, in turn, allows determination of the Z coordinate of point P in world coordinates. Knowing the translation and rotation for each camera coordinate system then allows the Z coordinate value for the point P in camera coordinates to be determined for each camera 1016A, 1016B, 1016C.

Figure 6:
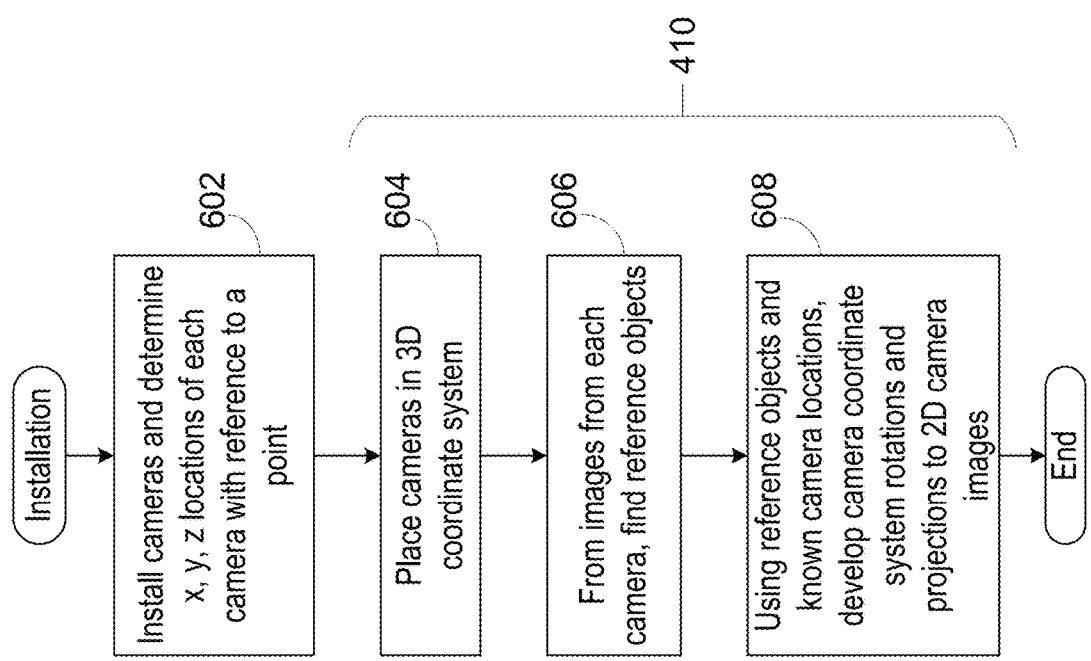
FIG. 6 is a flowchart of installation of a videoconferencing system according to an example of this disclosure.

In FIG. 6, camera installation procedures and the camera position determination and 3D coordinate system development of step 410 are detailed. In step 602, the cameras 1016A, 1016B and 1016C are installed in the conference room C. The x, y and z distances from a given location that serves as the origin of the 3D world coordinate system are determined. For example, referring to FIG. 1, the upper left corner of the conference room C at the floor is taken as the origin. The distances along the walls and from the walls and the height of each camera are measured from that corner at the floor. This provides the placement of each camera 1016A, 1016B and 1016C with respect to the origin of the 3D coordinate system. After the measurements are entered into the codec 1000, in step 604 the codec 1000 places each camera in the 3D world coordinate system as the beginning of step 410. This data then provides the translations used in transforming coordinates. In step 606, the codec 1000 selects reference objects from each camera image, with user assistance and confirmation if necessary. In step 608, using the reference objects and the known camera locations, the codec 1000 develops the rotations of the camera coordinate systems and performs the projections to the 2D camera images as discussed above, completing step 410. The result is that the rotation and translation of each set of camera coordinates to world coordinates has been determined and can be used to indicate the speaker location in world coordinates, allowing easier determination of the speaker in each camera view.

Figure 7:
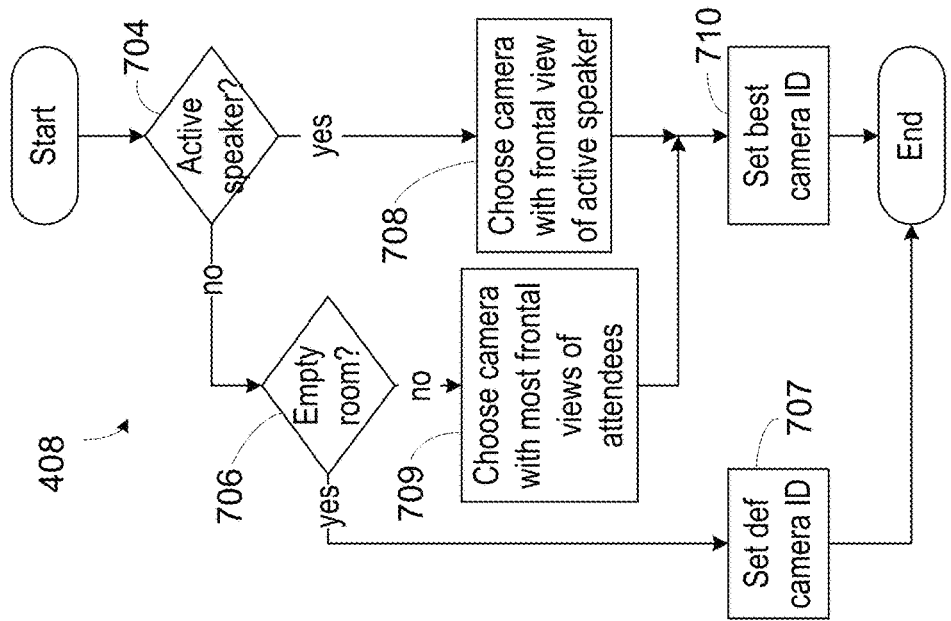
FIG. 7 is a flowchart of operation of the best camera selection step of FIG. 4 according to an example of this disclosure.

Referring to FIG. 7, the best camera selection step 408 is illustrated in more detail. In step 704, the SSL directional information is evaluated to determine if there is an active speaker. If not, in step 706, it is determined if there are attendees or the conference room C is empty. If the conference room C is empty, in step 707 a default camera ID is set, typically the center camera 1016B. If there are attendees, in step 709 the camera with the most frontal or facial views of the attendees is determined. This determination can be done using facial recognition techniques. There are many known facial recognition techniques.

Figure 9:
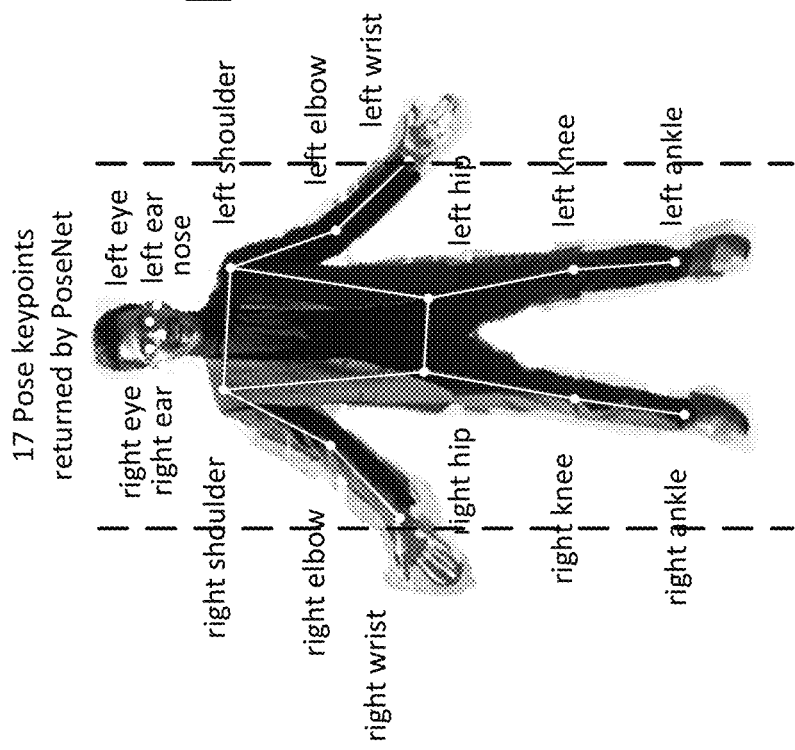
FIG. 9 is an illustration of keypoints used in the pose determination and pose matching steps according to an example of this disclosure.

In one example, a keypoint evaluation is performed. In most cases a neural network is used to develop keypoints or similar detailed pose information. Many different neural networks are available to develop keypoints, the most well-known being PoseNet. Exemplary keypoints determined by the PoseNet neural network are illustrated in FIG. 9. For each keypoint, there is score and position information. The higher the score, the more likely the feature is present. For example, if the nose score is 0.99, then the possibility of the nose feature is 99%. Pseudocode for the evaluation of step 709 is provided in Table 1

TABLE 1

```
cameraScore=o;
for (pose : cameraPoseList) {
    poseScore=o;
        sum = Sum score for 5 facial keypoints (nose, left/right eye, left/right ear)
        if (sum > THRESHOLD)
    poseScore=4*noseScore+2*min(leftEyeScore,rightEyeScore)+
    min(leftEarScore,rightEarScore);
    cameraScore += poseScore;
}
```

In one example, THRESHOLD is set at 2.5, so that a poseScore is computed when the possibility of a face is higher than 50%. Different weights are used for each facial keypoint as some keypoints, such as the nose, are more important. The cameraScore is the sum of the poseScores for each face in the camera image. For step 709, the highest cameraScore is the selected camera.

In some examples, because distances from the cameras vary and camera settings vary, various correction factors are applied to each poseScore. Each poseScore as computed above is multiplied by a sizescaleFactor and a brightness ScaleFactor. sizeScaleFactor is computed by comparing the face bounding box of two poses:

sizeScaleFactor=(pose1FaceBoundingBoxArea/
   pose2FaceBoundingBoxArea)

brightnessScaleFactor is computed by comparing the average luminance level of corresponding face bounding box of two poses:

brightnessScaleFactor=
   (pose1FaceBoundingBoxBrightness/
   pose2FaceBoundingBoxBrightness)

Other normalization methods can be applied in calculation of poseScore.

In other examples, simpler determinations can be used, such as performing facial detection for each camera and counting detected faces. In step 710, the determined best camera ID is set.

If there is an active speaker in step 704, in step 708 the facial pose information and the determined camera locations are evaluated to determine which camera has the best view of the face of the speaker. This determination is detailed in FIG. 8. In step 710, the determined best camera ID is set.

Figure 8:
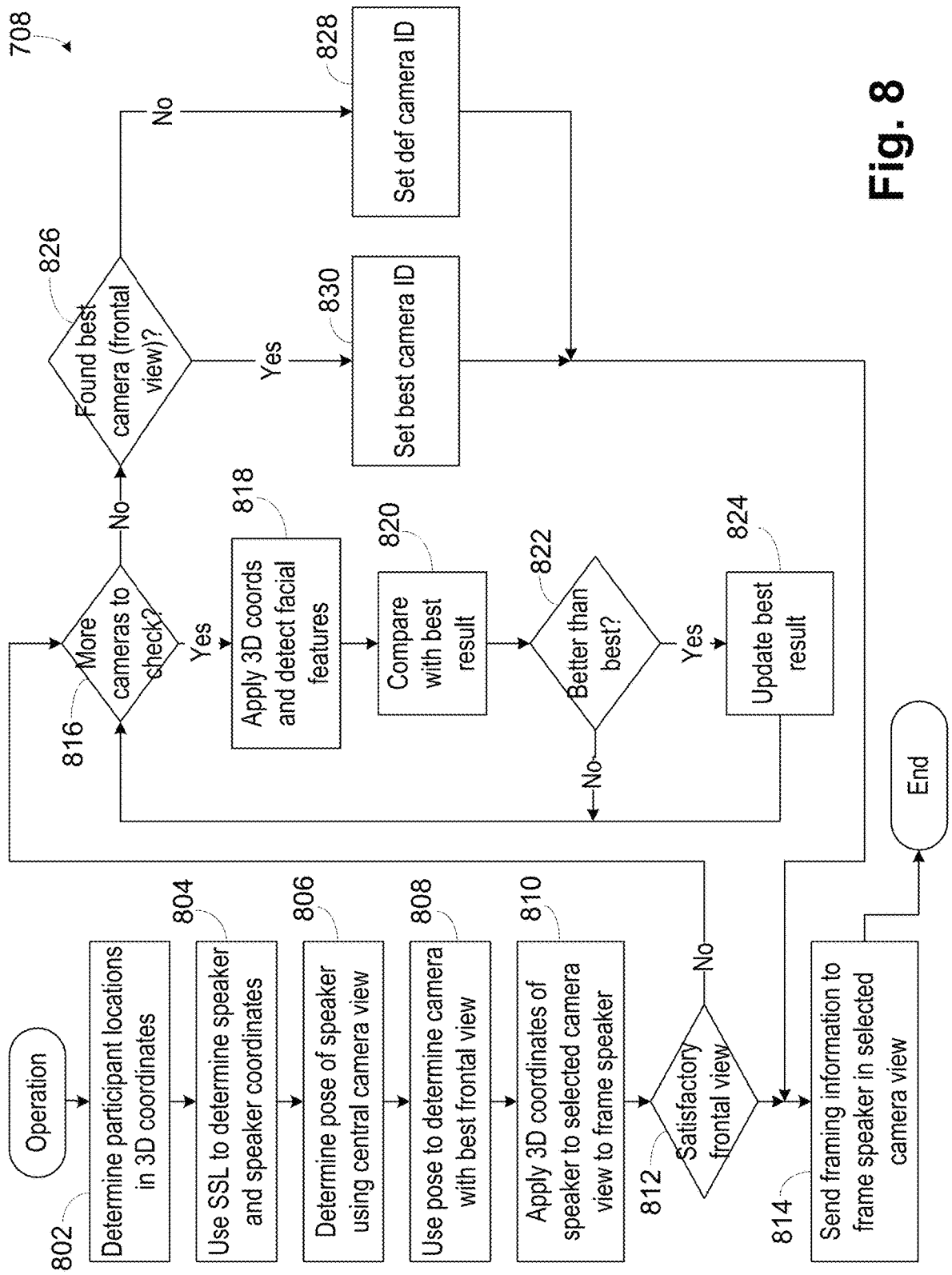
FIG. 8 is a flowchart of operation of the frontal view camera selection and framing determination step of FIG. 6 according to an example of this disclosure.

FIG. 8 illustrates step 708, camera selection when there is a speaker. In step 802, the location of each participant in the conference room C is determined in 3D world coordinates. Head and facial feature detection is performed for each camera 1016A, 1016B and 1016C. As the rotation and translation of each camera 1016A, 1016B and 1016C is known, the X and Y location of each participant is readily determined and then the Z location of each head can be determined. The locations are stored in a table, such as Table 2.

TABLE 2

| Individual | Camera 1016A | Camera 1016B | Camera 1016C |
|---|---|---|---|
| 1 | $T_{1A}$ | $T_{1B}$ | $T_{1C}$ |
| 2 | $T_{2A}$ | $T_{2B}$ | $T_{2C}$ |
| 3 | $T_{3A}$ | $T_{3B}$ | $T_{3C}$ |
| 4 | $T_{4A}$ | $T_{4B}$ | $T_{4C}$ |

The entry in each cell of the table is the location of the participant in world coordinates and the cluster center for the head of the participant. A clustering algorithm, such as k-means, is performed on the facial features of each detected participant for each camera, the facial features forming the clusters. This results in the development of a cluster center value to be placed in the table, the cluster center value then being the centroid of the participant's face, which then is a value to be used to frame the participant.

It is understood that each camera may have different participants as participants 1-4, as each camera 1016A, 1016B and 1016C will have the participants numbered differently based on their location in the camera 1016A, 1016B and 1016C view and the ordering of participants by the face finding operation. This is why Table 2 refers to individuals rather than participants. For example, referring to FIG. 2 and assuming that the head finding operation numbers individuals left to right, for camera 1016A the order is 1, 3, 2, 4; for camera 1016B the order is 1, 2, 3, 4; and for camera 1016C the order is 2, 4, 3, 1. The use of world coordinate position and cluster center location and the table entries allows this difference between cameras to be overcome.

In step 804, the SSL determination is used to determine the speaker by referencing the SSL direction and the locations of the participants in the view of the camera 1016B. Then the speaker's world coordinates are looked up based on the central camera 1016B entry for that individual in Table 2. In step 806, the pose of the speaker is developed from the central camera 1016B view. In step 808, the pose is used to determine the camera 1016A, 1016B, 1016C expected to have the best frontal view of the speaker, based on the known locations of the cameras 1016A and 1016C with respect to camera 1016B and the angle of the face and head with respect to the camera 1016B. In step 810, the 3D world coordinates of the speaker's last determined location and cluster center location from the table are compared to the table entries for the determined camera to determine the appropriate individual for the determined camera. The use of the 3D coordinates and cluster center location allows the speaker to be reidentified in the determined camera without the need for performing SSL from the determined camera. The determined camera's 3D world coordinate and cluster center locations are converted to 2D image coordinates of the determined camera to use as the center of the framed image of the speaker. In step 812, the framed image is evaluated to determine if the frontal view is satisfactory, so that a minimum amount of the participant's face is present. This can be done, for example, by analyzing the facial keypoints of the participant and determining a poseScore as described above.

The frontal view is satisfactory if the poseScore is over a selected value, such as 4 or 4.5. For example, keypoint scores of 0.6 for noseScore, 0.6 for the minimum of left-EyeScore and rightEyeScore and 0.5 for the minimum of leftEarScore and rightEareScore provide a poseScore of 4.1. If the frontal view is satisfactory, the framing information for the determined camera is provided for use in step 415 described above.

If the frontal view is not satisfactory, the camera with the best frontal view must be determined. The poseScore for the determined camera is stored as the first camera value. In step 816, it is determined if there are any more cameras to check. If so, in step 818 the 3D world coordinates of the speaker's last determined location and cluster center location from the table are compared to the table entries for the next camera to determine the appropriate participant for the next camera. The next camera's 3D world coordinate and cluster center locations are converted to 2D image coordinates of the determined camera to use as the center of the framed image of the speaker. The poseScore for the next camera is obtained and then in step 820 is compared or evaluated against the best result, which starts out as the poseScore of the determined camera.

Step 822 evaluates whether the quality of facial features provided by the next camera is better than the previous best. If so, the parameters and values of the next camera are stored in the best result in step 824. If not better than the best in step 822 or after updating in step 824, operation returns to step 816 to determine if there are any more cameras to check.

When no more cameras are ready to check, as in the example all of cameras 1016A, 1016B, and 1016C have been evaluated, operation proceeds to step 826 to determine if the best camera view indicates a satisfactory frontal view of the individual was found, such as by comparing to the selected value used in step 812. If there is no satisfactory frontal view of the speaker to be provided to the far end, in step 828 the selected camera is set to be a default camera, such as camera 1016B which provides a full room view. The default camera is preferably identified during setup of the videoconferencing system. If an acceptable or satisfactory frontal view is present, as determined in step 826, in step 830 that camera is set to be the desired or selected camera.

Figure 10:
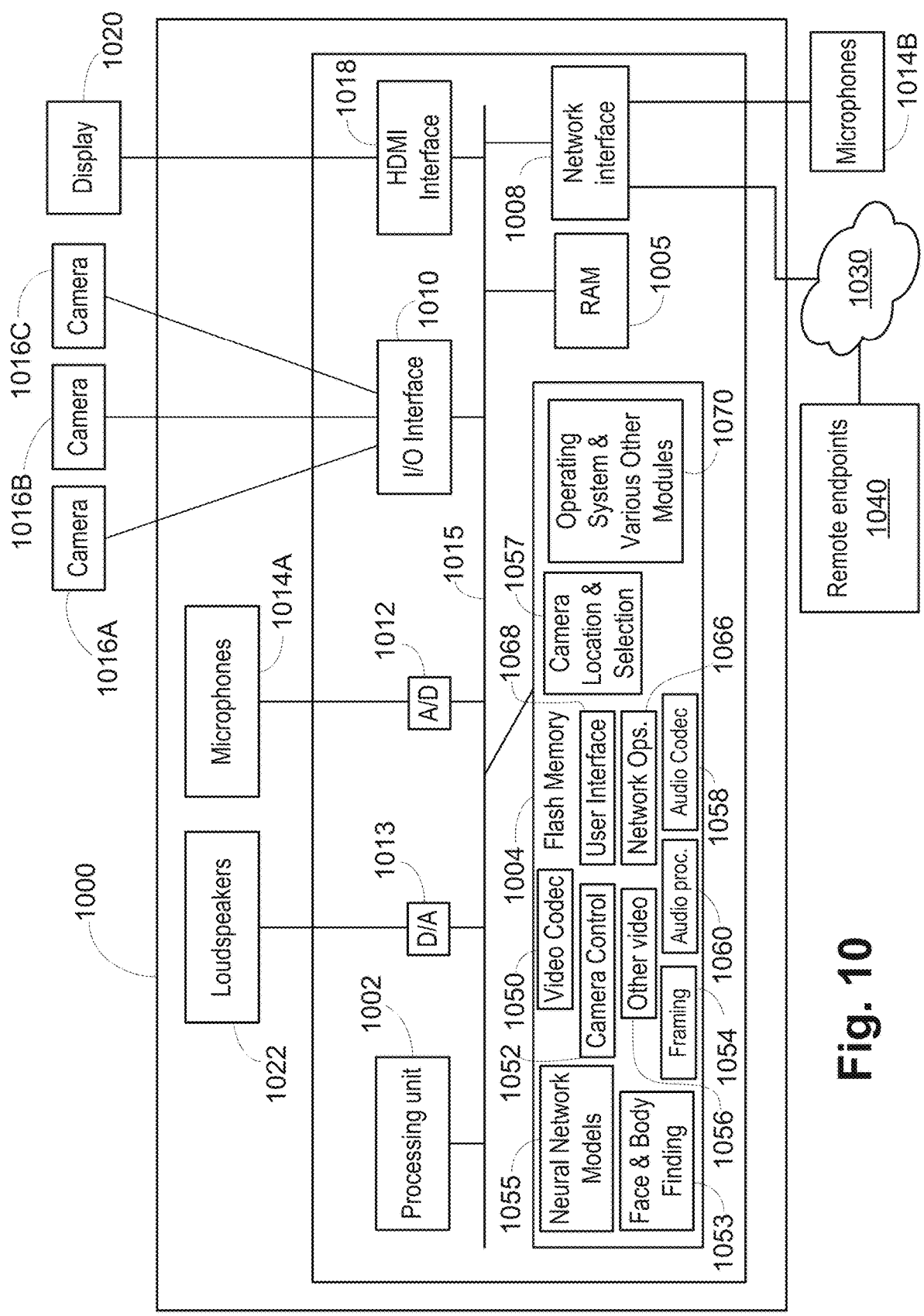
FIG. 10 is a block diagram of a codec according to an example of this disclosure.

FIG. 10 illustrates aspects of a codec 1000 in accordance with an example of this disclosure. The codec 1000 may include loudspeaker(s) 1022, though in many cases the loudspeaker 1022 is provided in the monitor 1020, and microphone(s) 1014A interfaced via interfaces to a bus 1015, the microphones 1014A through an analog to digital (A/D) converter 1012 and the loudspeaker 1022 through a digital to analog (D/A) converter 1013. The codec 1000 also includes a processing unit 1002, a network interface 1008, a flash memory 1004, RAM 1005, and an input/output (I/O) general interface 1010, all coupled by bus 1015. The camera(s) 1016A, 1016B, 1016C are illustrated as connected to the I/O interface 1010. Microphone(s) 1014B are connected to the network interface 1008. An HDMI interface 1018 is connected to the bus 1015 and to the external display or monitor 1020. Bus 1015 is illustrative and any interconnect between the elements can used, such as Peripheral Component Interconnect Express (PCIe) links and switches, Universal Serial Bus (USB) links and hubs, and combinations thereof. The cameras 1016A, 1016B, 1016C and microphones 1014A, 1014B can be contained in housings containing the other components or can be external and removable, connected by wired or wireless connections.

The processing unit 1002 can include digital signal processors (DSPs), central processing units (CPUs), graphics processing units (GPUs), dedicated hardware elements, such as neural network accelerators and hardware codecs, and the like in any desired combination.

The flash memory 1004 stores modules of varying functionality in the form of software and firmware, generically programs or instructions, for controlling the codec 1000. Illustrated modules include a video codec 1050, camera control 1052, face and body finding 1053, neural network models 1055, framing 1054, other video processing 1056, camera location and selection 1057, audio codec 1058, audio processing 1060, network operations 1066, user interface 1068 and operating system and various other modules 1070. The RAM 1005 is used for storing any of the modules in the flash memory 1004 when the module is executing, storing video images of video streams and audio samples of audio streams and can be used for scratchpad operation of the processing unit 1002. The camera location and selection 1057 performs steps 408 and 410. The face and body finding 1053 and neural network models 1055 are used in the various operations of the codec 1000, such as the face detection step 404, the pose determination step 406, best camera selection step 408, speaker frontal view step 708, and most frontal view step 709.

The network interface 1008 enables communications between the codec 1000 and other devices and can be wired, wireless or a combination. In one example, the network interface 1008 is connected or coupled to the Internet 1030 to communicate with remote endpoints 1040 in a videoconference. In one or more examples, the general interface 1010 provides data transmission with local devices such as a keyboard, mouse, printer, projector, display, external loudspeakers, additional cameras, and microphone pods, etc.

In one example, the cameras 1016A, 1016B, 1016C and the microphones 1014 capture video and audio, respectively, in the videoconference environment and produce video and audio streams or signals transmitted through the bus 1015 to the processing unit 1002. In at least one example of this disclosure, the processing unit 1002 processes the video and audio using algorithms in the modules stored in the flash memory 1004. Processed audio and video streams can be sent to and received from remote devices coupled to network interface 1008 and devices coupled to general interface 1010. This is just one example of the configuration of a codec 1000.

Figure 11:
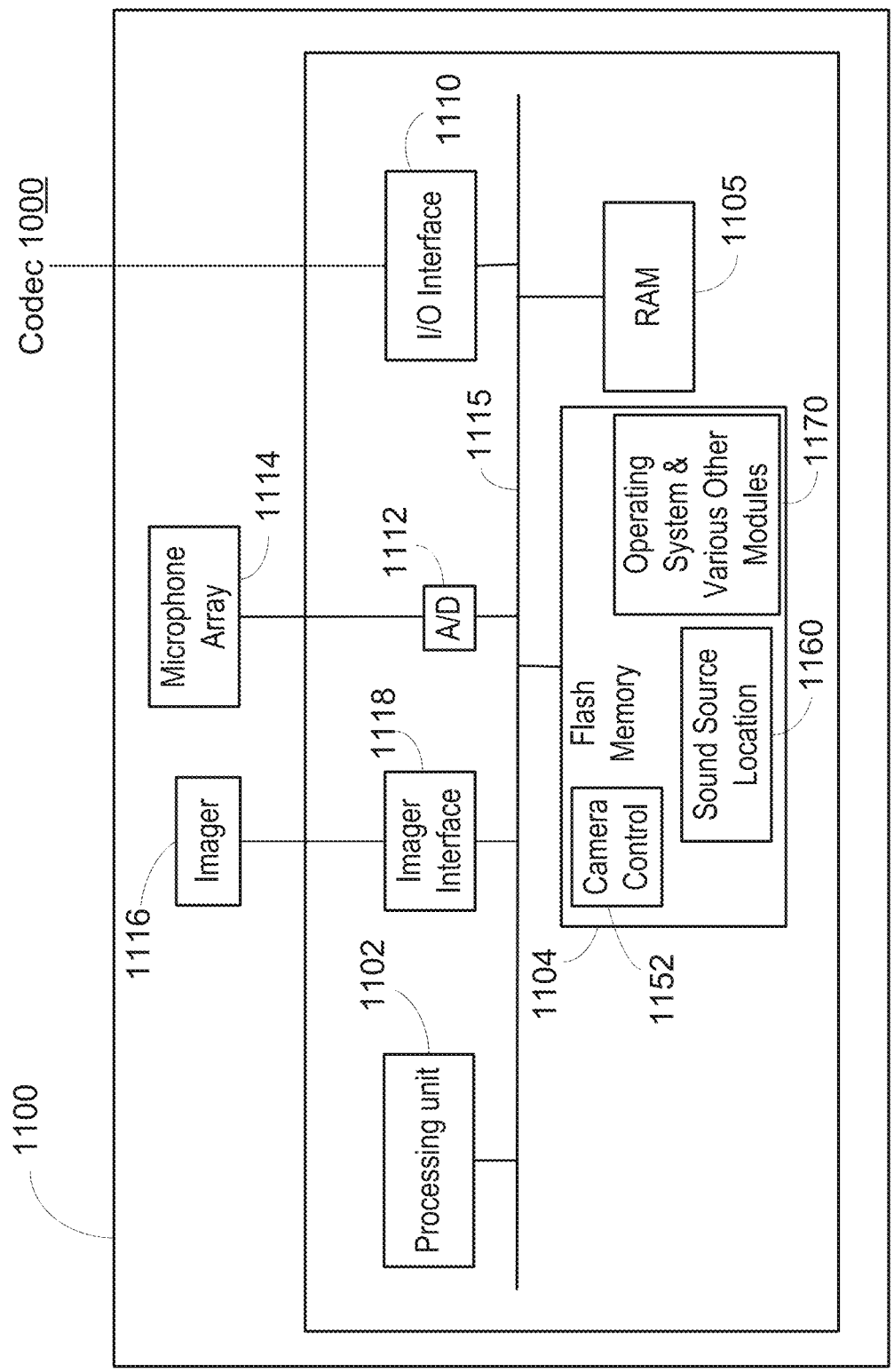
FIG. 11 is a block diagram of a camera according to an example of this disclosure.

FIG. 11 illustrates aspects of a camera 1100, such as camera 1016B, in accordance with an example of this disclosure. The camera 1100 includes an imager or sensor 1116 and a microphone array 1114 interfaced via interfaces to a bus 1115, the microphone array 1114 through an analog to digital (A/D) converter 1112 and the imager 1116 through an imager interface 1118. The camera 1100 also includes a processing unit 1102, a flash memory 1104, RAM 1105, and an input/output general interface 1110, all coupled by bus 1115. Bus 1115 is illustrative and any interconnect between the elements can used, such as Peripheral Component Interconnect Express (PCIe) links and switches, Universal Serial Bus (USB) links and hubs, and combinations thereof. The codec 1000 is connected to the I/O interface 1110, preferably using a USB interface.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, generically programs or instructions, for controlling the camera 1100. Illustrated modules include camera control 1152, sound source localization 1160 and operating system and various other modules 1170. The RAM 1105 is used for storing any of the modules in the flash memory 1104 when the module is executing, storing video images of video streams and audio samples of audio streams and can be used for scratchpad operation of the processing unit 1102.

Cameras 1016A, 1016C are similar to camera 1100 but do not include the microphone array 1114, A/D convert 1112 and SSL module 1160. In another example, the sound source localization is also performed by the codec 1000, with the center camera 1016B providing the audio streams from each microphone in the microphone array 1114.

Other configurations, with differing components and arrangement of components, are well known for both videoconferencing endpoints and for devices used in other manners.

Figure 12:
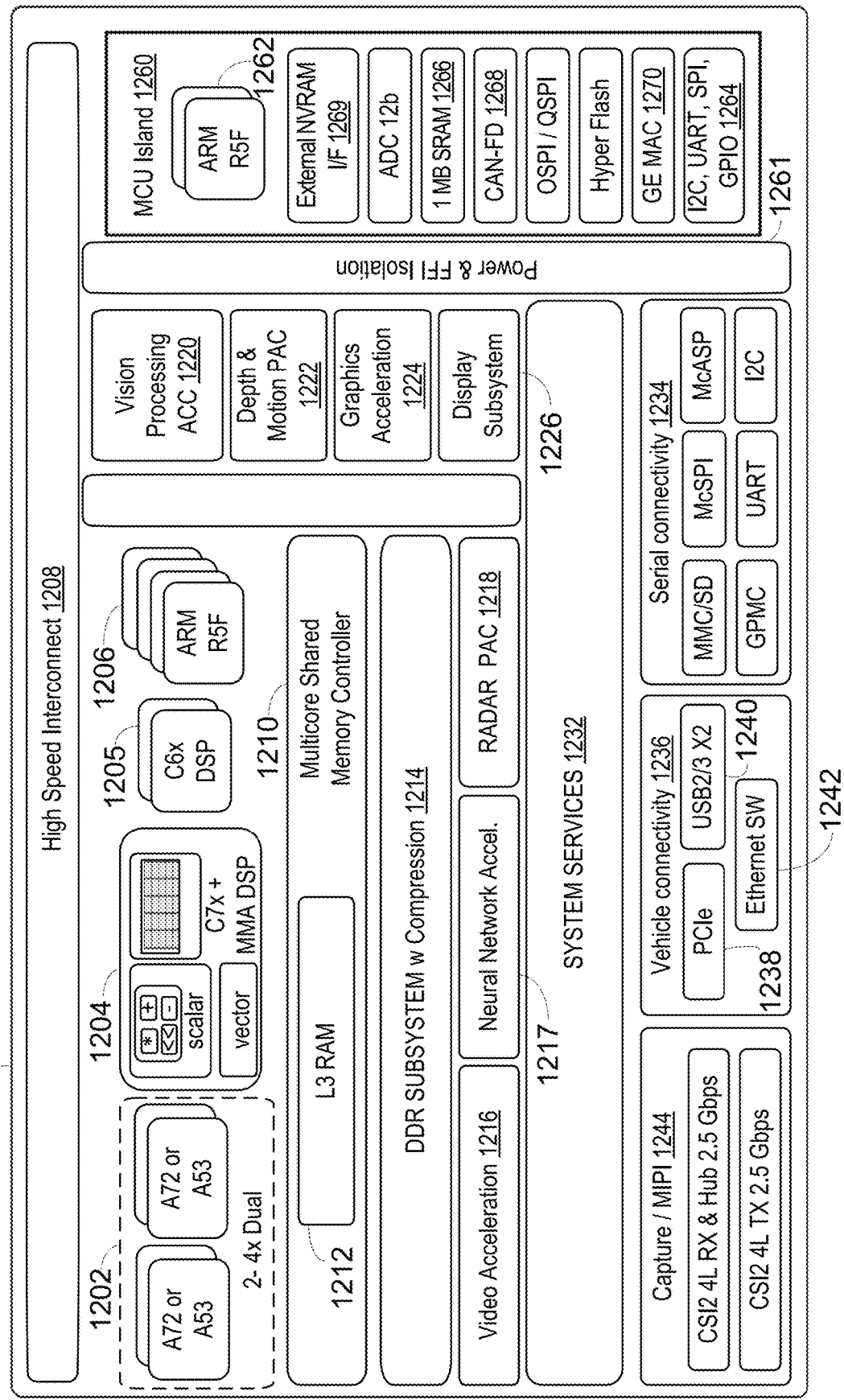
FIG. 12 is a block diagram of the processor units of FIGS. 9 and 10.

FIG. 12 is a block diagram of an exemplary system on a chip (SoC) 1200 as can be used as the processing unit 1002 or 1102. A series of more powerful microprocessors 1202, such as ARM® A72 or A53 cores, form the primary general-purpose processing block of the SoC 1200, while a more powerful digital signal processor (DSP) 1204 and multiple less powerful DSPs 1205 provide specialized computing capabilities. A simpler processor 1206, such as ARM R5F cores, provides general control capability in the SoC 1200. The more powerful microprocessors 1202, more powerful DSP 1204, less powerful DSPs 1205 and simpler processor 1206 each include various data and instruction caches, such as L1I, L1D, and L2D, to improve speed of operations. A high-speed interconnect 1208 connects the microprocessors 1202, more powerful DSP 1204, simpler DSPs 1205 and processors 1206 to various other components in the SoC 1200. For example, a shared memory controller 1210, which includes onboard memory or SRAM 1212, is connected to the high-speed interconnect 1208 to act as the onboard SRAM for the SoC 1200. A DDR (double data rate) memory controller system 1214 is connected to the high-speed interconnect 1208 and acts as an external interface to external DRAM memory. The RAM 1005 or 1105 are formed by the SRAM 1212 and external DRAM memory. A video acceleration module 1216 and a radar processing accelerator (PAC) module 1218 are similarly connected to the high-speed interconnect 1208. A neural network acceleration module 1217 is provided for hardware acceleration of neural network operations. A vision processing accelerator (VPACC) module 1220 is connected to the high-speed interconnect 1208, as is a depth and motion PAC (DMPAC) module 1222.

A graphics acceleration module 1224 is connected to the high-speed interconnect 1208. A display subsystem 1226 is connected to the high-speed interconnect 1208 to allow operation with and connection to various video monitors. A system services block 1232, which includes items such as DMA controllers, memory management units, general-purpose I/O's, mailboxes and the like, is provided for normal SoC 1200 operation. A serial connectivity module 1234 is connected to the high-speed interconnect 1208 and includes modules as normal in an SoC. A vehicle connectivity module 1236 provides interconnects for external communication interfaces, such as PCIe block 1238, USB block 1240 and an Ethernet switch 1242. A capture/MIPI module 1244 includes a four-lane CSI-2 compliant transmit block 1246 and a four-lane CSI-2 receive module and hub.

An MCU island 1260 is provided as a secondary subsystem and handles operation of the integrated SoC 1200 when the other components are powered down to save energy. An MCU ARM processor 1262, such as one or more ARM R5F cores, operates as a master and is coupled to the high-speed interconnect 1208 through an isolation interface 1261. An MCU general purpose I/O (GPIO) block 1264 operates as a slave. MCU RAM 1266 is provided to act as local memory for the MCU ARM processor 1262. A CAN bus block 1268, an additional external communication interface, is connected to allow operation with a conventional CAN bus environment in a vehicle. An Ethernet MAC (media access control) block 1270 is provided for further connectivity. External memory, generally non-volatile memory (NVM) such as flash memory 1004, is connected to the MCU ARM processor 1262 via an external memory interface 1269 to store instructions loaded into the various other memories for execution by the various appropriate processors. The MCU ARM processor 1262 operates as a safety processor, monitoring operations of the SoC 1200 to ensure proper operation of the SoC 1200.

It is understood that this is one example of an SoC provided for explanation and many other SoC examples are possible, with varying numbers of processors, DSPs, accelerators and the like.

Figure 13:
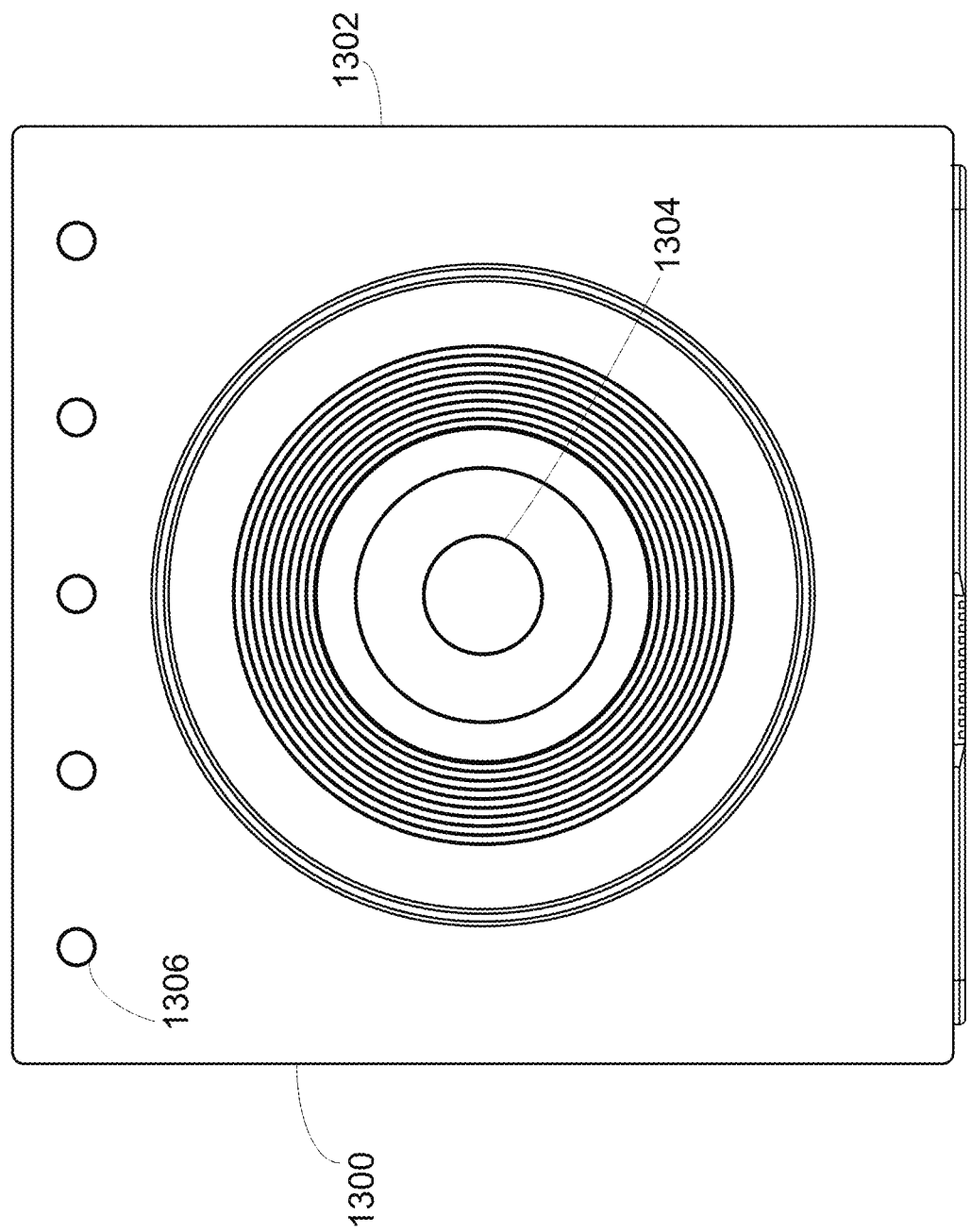
FIG. 13 is an illustration of the front view of a camera according to an example of this disclosure.

FIG. 13 provides a front view of a camera 1300, such as the camera 1016B and, optionally, the cameras 1016A and 1016C. The camera 1300 is a housing 1302 with a lens 1304 provided in the center to operate with the imager 1316. A series of five openings 1306 are provided as ports to the microphones in the microphone array 1114. It is noted that the microphone openings 1306 form a horizontal line to provide the desired angular determination for the sound source localization algorithm. This is an exemplary illustration of a camera 1300 and numerous other configurations are possible, with varying lens and microphone configurations.

While the above description has used a conference room as the exemplary environment, the environment can be any setting where multiple cameras can provide different views of a group of individuals.

While the above description has used three cameras as an example, it is understood that different numbers of cameras can be utilized from two to a limit depending on the processing capabilities and the particular environment. For example, in a larger venue with more varied seating, more cameras may be necessary to cover all individuals that may speak.

While the above description had the camera selection being performed in a codec, it is understood that different items can perform the camera selection. In one example, one camera of the number of cameras can be selected to perform the camera selection and to interact with the other cameras to control the provision of video streams from the cameras. In another example, a separate video mixing unit can perform the camera selection and other video processing and the codec can simply encode the selected camera video stream.

By determining the 3D coordinates of each participant for each camera, SSL is only needed in one camera. The speaker is determined based on the SSL and pose generation of the speaker is used to determine the camera likely to have the best frontal view of the speaker. The 3D coordinates of the speaker are used to frame the speaker in the view of the determined camera. The use of the 3D coordinates allows the reidentification of the speaker in the other cameras views without requiring each camera to include a microphone array for SSL processing. With SSL only needed in one camera, the other cameras can be simpler, lower cost cameras.

A system of one or more computers can be configured to perform particular operations or actions by virtue of having software, firmware, hardware, or a combination of them installed on the system that in operation causes or cause the system to perform the actions. The instructions of one or more computer programs can be configured to perform particular operations or actions by virtue of including instructions that, when executed by data processing apparatus, cause the apparatus to perform the actions. One general aspect includes a method for selecting a camera of a plurality of cameras. The method also includes determining the rotation and translation of a coordinate system of each of the plurality of cameras to a world coordinate system. The method also includes determining the world coordinates of each participant for each camera of the plurality of cameras. The method also includes utilizing sound source localization using the microphone array on the one camera to determine speaker direction information. The method also includes identifying a speaker in the group of participants using the speaker direction information and an image from the video stream of the one camera. The method also includes determining world coordinates of the speaker based on the identification. The method also includes determining facial pose of the speaker in the image from the video stream of the one camera. The method also includes selecting a camera from the plurality of cameras to provide a video stream for provision to the far end based on the locations of the plurality of cameras other than the one camera and the facial pose of the speaker. The method also includes utilizing the determined speaker world coordinates to frame the speaker in the video stream of the selected camera.

Examples may include one or more of the following features. The method may include selecting the camera of the plurality of cameras providing the most frontal views of participants when there is not a speaker and there are participants. The method may include: selecting a default camera when there are no participants. Determining the world coordinates of each participant includes storing the determined world coordinates of each participant in a table of cameras and individuals from the perspective of the camera, and where utilizing the determined speaker world coordinates to frame the speaker includes using the determined speaker world coordinates to find the appropriate individual for the selected camera from the table. The method may include determining if the frontal view of the speaker provided from the selected camera is satisfactory; and providing a framed view of the speaker from the selected camera when the frontal view of the speaker provided from the selected camera is satisfactory. The method may include utilizing the determined speaker world coordinates to evaluate the facial view of the speaker from each camera of the plurality of cameras other than the selected camera when the frontal view of the speaker provided from the selected camera is not satisfactory; and providing a framed view of the speaker from the camera of the plurality of cameras that has the best frontal view of the speaker when the frontal view of the speaker provided from the selected camera is not satisfactory. The one camera is the central camera of the plurality of cameras.

One general aspect includes a non-transitory processor readable memory containing instructions that when executed cause a processor or processors to perform a method of selecting a camera of a plurality of cameras. The non-transitory processor readable memory also includes instructions that when executed cause a processor or processors to determine the rotation and translation of a coordinate system of each of the plurality of cameras to a world coordinate system. The memory also includes instructions that when executed cause a processor or processors to determine the world coordinates of each participant for each camera of the plurality of cameras. The memory also includes instructions that when executed cause a processor or processors to utilize sound source localization using the microphone array on the one camera to determine speaker direction information. The memory also includes instructions that when executed cause a processor or processors to identify a speaker in the group of participants using the speaker direction information and an image from the video stream of the one camera. The memory also includes instructions that when executed cause a processor or processors to determine world coordinates of the speaker based on the identification. The memory also includes instructions that when executed cause a processor or processors to determine facial pose of the speaker in the image from the video stream of the one camera. The memory also includes instructions that when executed cause a processor or processors to select a camera from the plurality of cameras to provide a video stream for provision to the far end based on the locations of the plurality of cameras other than the one camera and the facial pose of the speaker. The memory also includes instructions that when executed cause a processor or processors to utilize the determined speaker world coordinates to frame the speaker in the video stream of the selected camera.

Examples may include one or more of the following features. The non-transitory processor readable memory may include: selecting the camera providing the most frontal views of participants when there is not a speaker and there are participants. The non-transitory processor readable memory the method may include instructions that when executed cause a processor or processors to select a default camera when there are no participants. Determining the world coordinates of each participant includes storing the determined world coordinates of each participant in a table of cameras and individuals from the perspective of the camera, and where utilizing the determined speaker world coordinates to frame the speaker includes using the determined speaker world coordinates to find the appropriate individual for the selected camera from the table. The non-transitory processor readable memory may include instructions that when executed cause a processor or processors to determine if the frontal view of the speaker provided from the selected camera is satisfactory; and providing a framed view of the speaker from the selected camera when the frontal view of the speaker provided from the selected camera is satisfactory. The non-transitory processor readable memory may include instructions that when executed cause a processor or processors to utilize the determined speaker world coordinates to evaluate the frontal view of the speaker from each camera of the plurality of cameras other than the selected camera when the frontal view of the speaker provided from the selected camera is not satisfactory; and provide a framed view of the speaker from the camera of the plurality of cameras that has the best frontal view of the speaker when the frontal view of the speaker provided from the selected camera is not satisfactory. The one camera is the central camera of the plurality of cameras.

One general aspect includes a system for selecting a camera of a plurality of cameras. The system also includes a plurality of cameras, each camera including an imager. Each camera also includes a camera output interface for providing data and a video stream. Each camera also includes camera random access memory (RAM). Each camera also includes a camera processor coupled to the imager, the camera output interface and the camera RAM for executing instructions. Each camera also includes camera memory coupled to the camera processor for storing instructions executed by the processor, the camera memory storing instructions executed by the camera processor to perform the operation of providing a video stream from the camera. The system also includes one camera of the plurality of cameras further including a microphone array and the camera memory of the one camera further storing instructions to utilize sound source localization using the microphone array to determine direction information and provide the direction information. The system also includes a codec coupled to the plurality of cameras, the codec including a codec input interface for coupling to the plurality of cameras to receive data and video streams. The codec also includes a network interface for communicating with the far end. The codec also includes codec RAM. The codec also includes a codec processor coupled to the network interface, the codec input interface and the codec RAM for executing instructions. The codec also includes codec memory coupled to the codec processor for storing instructions executed by the processor, the memory storing instructions executed by the codec processor to perform the operation of determining the rotation and translation of a coordinate system of each of the plurality of cameras to a world coordinate system. The memory storing instructions executed by the codec processor also includes determining the world coordinates of each participant for each camera of the plurality of cameras. The memory storing instructions executed by the codec processor also includes utilizing sound source localization using the microphone array on the one camera to determine speaker direction information. The memory storing instructions executed by the codec processor also includes identifying a speaker in the group of participants using the speaker direction information and an image from the video stream of the one camera. The memory storing instructions executed by the codec processor also includes determining world coordinates of the speaker based on the identification. The memory storing instructions executed by the codec processor also includes determining facial pose of the speaker in the image from the video stream of the one camera. The memory storing instructions executed by the codec processor also includes selecting a camera from the plurality of cameras to provide a video stream for provision to the far end based on the locations of the plurality of cameras other than the one camera and the facial pose of the speaker. The memory storing instructions executed by the codec processor also includes utilizing the determined speaker world coordinates to frame the speaker in the video stream of the selected camera.

Examples may include one or more of the following features. The codec memory further storing instructions executed by the codec processor to perform the operation of selecting the camera providing the most frontal views of participants when there is not a speaker and there are participants. The codec memory further stores instructions executed by the codec processor to perform the operation of selecting a default camera when there are no participants. Determining the world coordinates of each participant includes storing the determined world coordinates of each participant in a table of cameras and individuals from the perspective of the camera, and where utilizing the determined speaker world coordinates to frame the speaker includes using the determined speaker world coordinates to find the appropriate individual for the selected camera from the table. The codec memory further stores instructions executed by the codec processor to perform the operation of determining if the frontal view of the speaker provided from the selected camera is satisfactory; and providing a framed view of the speaker from the selected camera when the frontal view of the speaker provided from the selected camera is satisfactory. The codec memory further stores instructions executed by the codec processor to perform the operation of utilizing the determined speaker world coordinates to evaluate the frontal view of the speaker from each camera of the plurality of cameras other than the selected camera when the frontal view of the speaker provided from the selected camera is not satisfactory; and providing a framed view of the speaker from the camera of the plurality of cameras that has the best frontal view of the speaker when the frontal view of the speaker provided from the selected camera is not satisfactory.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. A method for selecting a camera of a plurality of cameras, each with a different view of a group of participants in an environment and providing a video stream, one camera of the plurality of cameras having a microphone array, to provide a video stream for provision to a far end, the method comprising:
   determining world coordinates of each participant for each camera of the plurality of cameras;
   utilizing sound source localization using the microphone array on the one camera to determine speaker direction information;
   identifying a speaker in the group of participants using the speaker direction information and an image from the video stream of the one camera;
   determining world coordinates of the speaker based on the identification;
   determining facial pose of the speaker in the image from the video stream of the one camera;
   selecting a camera from the plurality of cameras to provide a video stream for provision to the far end based on the locations of the plurality of cameras other than the one camera and the facial pose of the speaker; and
   utilizing the determined speaker world coordinates to frame the speaker in the video stream of the selected camera.

2. The method of claim 1, further comprising:
   determining the rotation and translation of a coordinate system of each of the plurality of cameras to the world coordinate system.

3. The method of claim 1, further comprising:
   selecting the camera of the plurality of cameras providing the most frontal views of participants when there is not a speaker and there are participants; and
   selecting a default camera when there are no participants.

4. The method of claim 1, wherein determining the world coordinates of each participant includes storing the determined world coordinates of each participant in a table of cameras and individuals from the perspective of the camera, and
   wherein utilizing the determined speaker world coordinates to frame the speaker includes using the determined speaker world coordinates to find the appropriate individual for the selected camera from the table.

5. The method of claim 1, further comprising:
   determining if the frontal view of the speaker provided from the selected camera is satisfactory; and
   providing a framed view of the speaker from the selected camera when the frontal view of the speaker provided from the selected camera is satisfactory.

6. The method of claim 5, further comprising:
   utilizing the determined speaker world coordinates to evaluate the facial view of the speaker from each camera of the plurality of cameras other than the selected camera when the frontal view of the speaker provided from the selected camera is not satisfactory; and
   providing a framed view of the speaker from the camera of the plurality of cameras that has the best frontal view of the speaker when the frontal view of the speaker provided from the selected camera is not satisfactory.

7. The method of claim 1, wherein the one camera is the central camera of the plurality of cameras.

8. A non-transitory processor readable memory containing instructions that when executed cause a processor or processors to perform the following method of selecting a camera of a plurality of cameras, each with a different view of a group of participants in an environment and providing a video stream, one camera of the plurality of cameras having a microphone array, to provide a video stream for provision to a far end, the method comprising:
   determining the world coordinates of each participant for each camera of the plurality of cameras;
   utilizing sound source localization using the microphone array on the one camera to determine speaker direction information;
   identifying a speaker in the group of participants using the speaker direction information and an image from the video stream of the one camera;
   determining world coordinates of the speaker based on the identification;
   determining facial pose of the speaker in the image from the video stream of the one camera;
   selecting a camera from the plurality of cameras to provide a video stream for provision to the far end based on the locations of the plurality of cameras other than the one camera and the facial pose of the speaker; and
   utilizing the determined speaker world coordinates to frame the speaker in the video stream of the selected camera.

9. The non-transitory processor readable memory of claim 8, the method further comprising:
   determining the rotation and translation of a coordinate system of each of the plurality of cameras to a world coordinate system.

10. The non-transitory processor readable memory of claim 9, the method further comprising:
    selecting the camera providing the most frontal views of participants when there is not a speaker and there are participants; and
    selecting a default camera when there are no participants.

11. The non-transitory processor readable memory of claim 8, wherein determining the world coordinates of each participant includes storing the determined world coordinates of each participant in a table of cameras and individuals from the perspective of the camera, and
    wherein utilizing the determined speaker world coordinates to frame the speaker includes using the determined speaker world coordinates to find the appropriate individual for the selected camera from the table.

12. The non-transitory processor readable memory of claim 8, the method further comprising:
   determining if the frontal view of the speaker provided from the selected camera is satisfactory; and
   providing a framed view of the speaker from the selected camera when the frontal view of the speaker provided from the selected camera is satisfactory.

13. The non-transitory processor readable memory of claim 12, the method further comprising:
   utilizing the determined speaker world coordinates to evaluate the frontal view of the speaker from each camera of the plurality of cameras other than the selected camera when the frontal view of the speaker provided from the selected camera is not satisfactory; and
   providing a framed view of the speaker from the camera of the plurality of cameras that has the best frontal view of the speaker when the frontal view of the speaker provided from the selected camera is not satisfactory.

14. The non-transitory processor readable memory of claim 8, wherein the one camera is the central camera of the plurality of cameras.

15. A system for selecting a camera of a plurality of cameras, each with a different view of a group of participants in an environment, to provide a video stream for provision to a far end, the system comprising:
   a plurality of cameras, each camera including:
      an imager;
      a camera output interface for providing data and a video stream;
      camera random access memory (RAM);
      a camera processor coupled to the imager, the camera output interface and the camera RAM for executing instructions; and
      camera memory coupled to the camera processor for storing instructions executed by the processor, the camera memory storing instructions executed by the camera processor to perform the operation of providing a video stream from the camera,
      one camera of the plurality of cameras further including a microphone array and the camera memory of the one camera further storing instructions to utilize sound source localization using the microphone array to determine direction information and provide the direction information; and
   a codec coupled to the plurality of cameras, the codec including:
      a codec input interface for coupling to the plurality of cameras to receive data and video streams;
      a network interface for communicating with the far end;
      codec RAM;
      a codec processor coupled to the network interface, the codec input interface and the codec RAM for executing instructions; and
      codec memory coupled to the codec processor for storing instructions executed by the processor, the memory storing instructions executed by the codec processor to perform the operations of:
         determining the world coordinates of each participant for each camera of the plurality of cameras;
         utilizing sound source localization using the microphone array on the one camera to determine speaker direction information;
         identifying a speaker in the group of participants using the speaker direction information and an image from the video stream of the one camera;
         determining world coordinates of the speaker based on the identification;
         determining facial pose of the speaker in the image from the video stream of the one camera;
         selecting a camera from the plurality of cameras to provide a video stream for provision to the far end based on the locations of the plurality of cameras other than the one camera and the facial pose of the speaker; and
         utilizing the determined speaker world coordinates to frame the speaker in the video stream of the selected camera.

16. The system of claim 15, wherein the codec memory further stores instructions executed by the codec processor to perform the operation of:
   determining the rotation and translation of a coordinate system of each of the plurality of cameras to a world coordinate system.

17. The system of claim 16, wherein the codec memory further stores instructions executed by the codec processor to perform the operations of:
   selecting the camera providing the most frontal views of participants when there is not a speaker and there are participants; and
   selecting a default camera when there are no participants.

18. The system of claim 15, wherein determining the world coordinates of each participant includes storing the determined world coordinates of each participant in a table of cameras and individuals from the perspective of the camera, and
   wherein utilizing the determined speaker world coordinates to frame the speaker includes using the determined speaker world coordinates to find the appropriate individual for the selected camera from the table.

19. The system of claim 15, wherein the codec memory further stores instructions executed by the codec processor to perform the operation of:
   determining if the frontal view of the speaker provided from the selected camera is satisfactory; and
   providing a framed view of the speaker from the selected camera when the frontal view of the speaker provided from the selected camera is satisfactory.

20. The system of claim 19, wherein the codec memory further stores instructions executed by the codec processor to perform the operation of:
   utilizing the determined speaker world coordinates to evaluate the frontal view of the speaker from each camera of the plurality of cameras other than the selected camera when the frontal view of the speaker provided from the selected camera is not satisfactory; and
   providing a framed view of the speaker from the camera of the plurality of cameras that has the best frontal view of the speaker when the frontal view of the speaker provided from the selected camera is not satisfactory.

* * * * *